United States Patent [19]

White et al.

[11] Patent Number: 4,653,798
[45] Date of Patent: Mar. 31, 1987

[54] SUN VISOR MIRROR

[76] Inventors: Jay E. White, 2937 Strawberry; Jay R. White, 4388 Lehigh Dr., both of Troy, Mich. 48098

[21] Appl. No.: 812,003

[22] Filed: Dec. 23, 1985

[51] Int. Cl.[4] .............................. B60J 3/02; G02B 7/18
[52] U.S. Cl. ............................... 296/97 H; 296/97 R; 350/606
[58] Field of Search ............ 350/606; 296/97 H, 97 B

[56] References Cited

U.S. PATENT DOCUMENTS 4,000,404 12/1976 Marcus ................................. 350/606
4,353,592 10/1982 Cziptschirsch ................... 296/97 H
4,378,129 3/1983 Kaiser et al. ...................... 296/97 H

FOREIGN PATENT DOCUMENTS 2220711 11/1973 Fed. Rep. of Germany ... 296/97 H
2429685 1/1980 France .............................. 296/97 H
2431932 3/1980 France .............................. 296/97 H
1327985 8/1973 United Kingdom ................ 350/606

Primary Examiner—Jon W. Henry
Attorney, Agent, or Firm—Irvin L. Groh

[57] ABSTRACT

A sun visor and vanity mirror assembly. A sliding door covers the mirror for protection should the mirror be broken, and when the mirror is in use, the door is slid below the visor outer cover obviating the potential danger of a hinge-type door.

14 Claims, 5 Drawing Figures

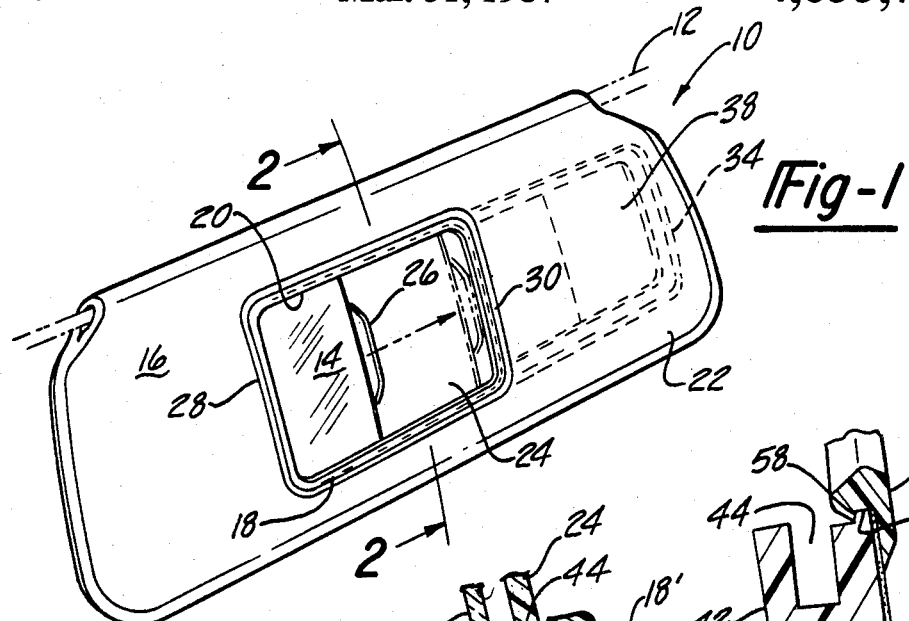
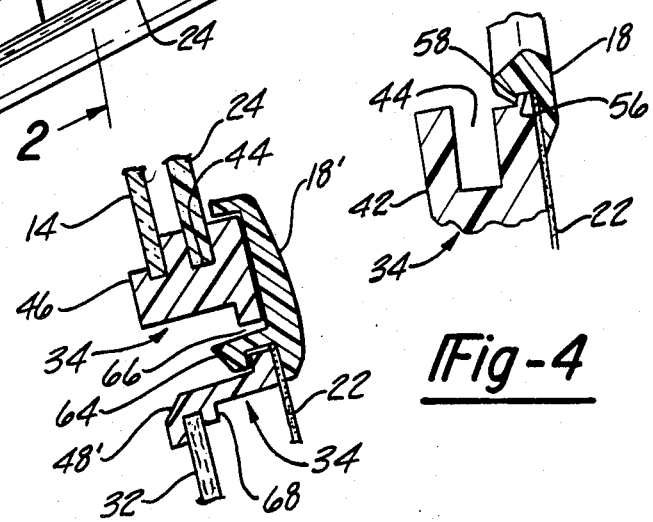
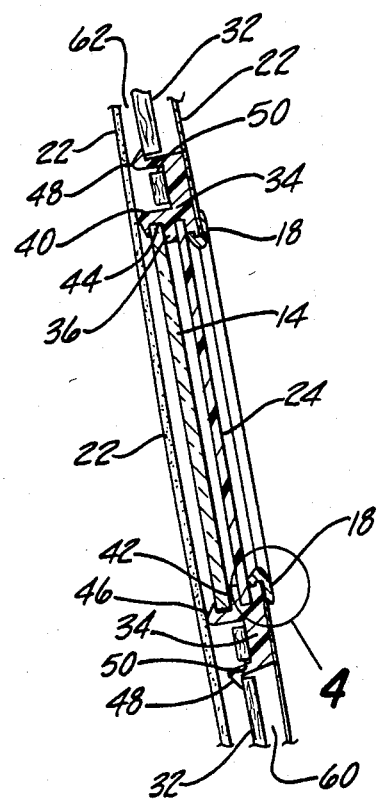
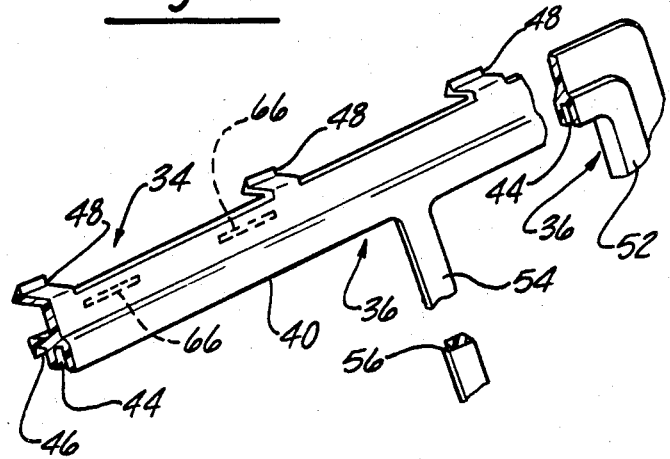

SUN VISOR MIRROR

This invention relates to a sun visor assembly incorporating a vanity mirror, and, more particularly, to a visor and mirror assembly incorporating a door which covers the mirror when not in use.

Automotive sun visors are usually provided to shield the driver and front seat passenger from sunlight. Because of their location, they make an ideal place to locate a vanity mirror. The mirror may be mounted in a variety of ways, such as by a simple clip or adhesive. With an increasing concern for safety and a desire to present aestheticially pleasing appearance, many mirrors are built into the visor which is usually padded for the same reasons. In order to eliminate undesirable reflections and provide protection against broken glass in the event of a crash, covers have been occasionally provided.

It is to an improved type of visor and vanity mirror assembly having a movable mirror cover that this invention is directed.

It will be seen from a description of this invention that improved safety has been provided while enhancing the appearance, particularly when the mirror is in use.

The foregoing purposes have been accomplished in a sun visor and vanity mirror assembly in which a sliding door is used to cover the mirror. A central core of molded plastic or chip board provides a support around which the conventional padding and an outside covering fabric is built. A rectangular frame is attached to the board and provides the means for holding a door for sliding movement between a closed position in which the mirror is covered and an open position in which the mirror is exposed for use and the cover is in a storage position.

The rectangular open center frame has a molding portion provided with recesses along its longitudinal sides receiving the door in sliding engagement. The mirror is located adjacent one end of the frame between the frame and the support board. This may be accomplished by mounting the mirror directly to the board by an adhesive with the board being flat, recessed or contoured to receive the mirror. In another form, the frame molding is provided with mounting tabs or longitudinal grooves in which the mirror can be snapped or cemented.

In a preferred form, the support board is provided with a rectangular cutout to receive the frame molding confining the mirror in the molding recesses between the sides of the frame and the support board.

Preferably the door is molded as a unitary structure with a handle projecting outwardly at one end of the door so that the handle moves across the mirror as the door is opened.

The outer portion of the frame beyond the inner door molding is provided with a plurality of tangs which are received in mounting holes in the support board.

The outside cover extends over the visor and has an opening concident with the mirror. A bezel is mounted on the molding in front of the mirror, retaining the edges of the outside cover along the opening between the bezel and the molding so that the mirror holding portion of the frame is hidden by the bezel, and the door storage portion of the frame is hidden by the outside cover.

The preferred embodiments of the invention are illustrated in the drawing in which:

FIG. 1 is a perspective view of the visor and vanity mirror assembly with the door shown in a partially opened position showing the extent of the frame molding in dotted lines providing the storage position for the door;

FIG. 2 is sectional view of the visor and mirror assembly taken along line 2—2 of FIG. 1 showing the details of the frame molding with the door receiving recesses and mirror receiving recesses along with the frame retention tangs coacting with the support board. The mirror framing or bordering bezel is also shown relative to the outside cover and mounting molding;

FIG. 3 is a fragmentary perspective view showing the rectangular frame with its inner molding portion having the door receiving recess and the mirror receiving groove along with a cross strut which supports one end of the bezel. The support tangs are also shown on the outer longitudinal portion of the frame;

FIG. 4 is an enlarged fragmentary view of the portion encircled in FIG. 2 showing the attachment of the bezel and outer cover to the frame molding; and FIG. 5 is an enlarged fragmentary view similar to FIG. 4 showing an alternate bezel construction and its attachment to the frame.

Referring to FIG. 1, the sun visor and vanity mirror assembly is shown with a support rod 12 extending through its upper end for attachment to a vehicle with a conventional swivel bracket, not shown. The visor assembly 10 is shown in its depending, use position with the vanity mirror 14 mounted in a recessed manner on the forward face 16. Bezel 18 surrounds the mirror opening 20 forming a decorative mirror frame or border. Outside fabric 22 completely covers the visor except for the mirror opening portion 20 and the edges of the fabric are retained underneath the bezel 18. The mirror door 24 is shown in a partially open position with its handle 26 extending outwardly adjacent one edge of the door through the bezel 18 so that its coaction with the left and right sides 28 and 30 of the bezel limits the door movement in its closed and open positions, respectively.

The structural integrity of the visor 10 is maintained by a central support board 32 which can be of molded plastic or a chip board, and which, as shown in FIGS. 1 and 2, is cutout to receive rectangular frame member 34 and which embraces the longitudinal extent of the mirror and the door in its fully open position, which places the door at a storage location 38 at the opposite end of the frame 34 from the mirror location 20.

As best seen in FIGS. 2 and 3, the frame 34 has an inner molding 36 of a closed rectangular form fitting in the mirror opening 20 and continguous door storage area 38. The upper and lower longitudinal sides 40 and 42 contain recesses or grooves 44 extending their entire length which act as tracks to receive door 24 for sliding movement therein. Molding 36 is preferably also provided with retention means in the form of tabs 46, a pair of which are formed integrally on the back of both the upper side 40 and lower side 42 of the molding 36 to hold the mirror 14.

Frame 34 is retained in support board 32 by a number of tang holding projections 48 which are spaced along the upper and lower longitudinal lengths of the frame and protrude into the rectangular cutout as shown in FIG. 5 or separate mounting holes 50 in board 32, as shown in FIG. 2, springing outwardly to maintain a firm mounting of the frame to the board. In addition to end walls 52 at either end of the frame 34, the cross strut 54 provides additional strength, and with one of the end walls 52 and upper and lower sides 40 and 42 furnishes the means for mounting bezel 18.

As can best be seen in FIG. 4, the bezel has hook elements 56 which can be formed by deforming the plastic bezel 18 at spaced points to engage the lip 58 on the frame. Outside fabric or covering 22 is retained against the frame 34 by the bezel 18. The areas 60 and 62 on the both sides of support board 32 within outside cover 22 are filled with padding or the like.

An alternate bezel 18 and mounting construction is shown in FIG. 5 in which the hook elements 56 are replaced with mounting tabs 64 which extend into slots or aperature 66 in frame 34 outward from molding 36. FIG. 5 also shows the mounting tangs 48 extending into the rectangular cutout in support board 32 with additional lip 68 which coacts with edges of the rectangular opening.

The completed visor and vanity mirror assembly 10 provides a clean line, eye pleasing structure which allows simple access to the mirror 14 by pushing handle 26, moving door 24 into its hidden door storage area 38 without the attendant hazard of a projecting sharp edged structure afforded by a conventional hinged cover.

The embodiments of the invention in which an exclusive property or priviledge are claimed is as follows:

1. A visor and vanity mirror assembly comprising in combination: a mirror; a unitary door configured to cover said mirror in a closed position; a generally rectangular frame having inner and outer portions with said outer portion having a plurality of mounting tangs projecting therefrom, said mirror being mounted adjacent one end of said frame and said door having its longitudinal edges mounted in recesses in said frame for sliding movement from said closed position at one end of said frame to an open position for storage at the other end of said frame exposing said mirror for use; and a support board having a cut out receiving the inner portion of said frame and receiving said tangs in frame mounting engagement.

2. The visor and mirror assembly of claim 1 wherein said door has an outwardly projecting handle at an end edge for movement over said mirror.

3. The visor and mirror assembly of claim 1 further comprising a bezel mounted on the inner portion of said frame in front of said mirror acting as a border for said mirror; and an outside cover extending over said visor and having an opening, the edges of which are retained between said bezel and frame, said outside cover completely hiding the door storage end of said frame.

4. A visor and vanity mirror assembly comprising in combination; a support board, a mirror facing one side of said visor; a door configured to cover said mirror in a closed position, a generally rectangular frame mounted to said board having a molding defining the inner periphery of said frame, said molding having retaining means along the longitudinal sides thereof for retention of said mirror and recesses forward of said retaining means along the longitudinal sides of said molding receiving said door for sliding movement therein between a closed position covering said mirror and an open position in which said mirror is exposed for use when said door is in a storage position; an outside cover extending over said visor and having an opening coincident with said mirror; and a bezel mounted on said molding in front of said mirror and retaining the edges of said outside cover along said opening between said bezel and said molding whereby the mirror holding portion of said frame is hidden by said bezel and the door storage portion of said frame is hidden by said outside cover.

5. The visor and mirror assembly of claim 4 wherein said support board has a cutout receiving said frame molding.

6. The visor and mirror assembly of claim 4 wherein said frame has a plurality of mounting tangs outwardly from said molding along the longitudinal sides thereof engaging said support board adjacent the edges of said cut out.

7. The visor and mirror assembly of claim 4 wherein said door has a handle at its end edge closest to the end of the frame mounting said mirror, said handle projecting through the opening surrounding said bezel.

8. A visor and vanity mirror assembly comprising, in combination: a support board; a generally rectangular frame having a plurality of mounting tangs extending outwardly along both longitudinal sides of said frame and engaging said support board for mounting said frame to said board; a mirror mounted between said frame and said support board with an end adjacent one end of said frame; a door configured to cover said mirror in a closed position; said frame having a molding defining the inner periphery thereof, said molding having a recess along each longitudinal side for retention of said door for sliding movement between said closed position covering said mirror at one end of said frame and an open position in which said mirror is exposed for use and said door is in a storage position at the other end of said frame; an outside cover extending over said visor and having an opening coincident with said mirror; a bezel mounted on said molding in front of said mirror and retaining the edges of said outside cover along said opening between said bezel and said molding whereby the door storage end of said frame is hidden by said outside cover; and a handle projecting from the end of said door adjacent the mirror end of said frame, said handle projecting outwardly through said bezel permitting the sliding movement of said door.

9. The visor and mirror assembly of claim 8 wherein said molding has retaining means along its longitudinal sides mounting said mirror.

10. The visor and mirror assembly of claim 9 wherein said support board has a rectangular cutout receiving said molding.

11. The visor and mirror assembly of claim 10 wherein said mounting tangs extend through said rectangular cutout to engaged said support board.

12. The visor and mirror assembly of claim 10 wherein said mounting tangs extend through holes in said support board located outwardly from said rectangular cutout to engage said support board.

13. The visor and mirror assembly of claim 8 wherein said frame has a cross strut forming part of the molding for mounting said bezel.

14. The visor and mirror assembly of claim 10 wherein said frame has a plurality of bezel mounting apertures along both longitudinal sides and said bezel has a pluraility of mounting tabs on said bezel extending through said aperatures mounting said bezel to said molding.

* * * * *